United States Patent [19]

Rutshtein et al.

[11] 3,979,655

[45] Sept. 7, 1976

[54] CONTROL SYSTEM FOR CONTROLLING A DYNAMIC COMPRESSOR

[75] Inventors: Alexander Rutshtein; Naum Staroselsky, both of West Des Moines, Iowa

[73] Assignee: Compressor Controls Corporation, Des Moines, Iowa

[22] Filed: Mar. 31, 1975

[21] Appl. No.: 563,662

[52] U.S. Cl. .............................. 318/609; 415/11; 415/171; 290/52
[51] Int. Cl.² .......................................... G05B 1/02
[58] Field of Search ................. 318/609, 615, 625; 415/11, 171; 290/52

[56] References Cited
UNITED STATES PATENTS

| | | | |
|---|---|---|---|
| 2,751,187 | 6/1956 | Deriaz | 415/171 |
| 3,773,429 | 11/1973 | Hayward | 415/11 |

Primary Examiner—Robert K. Schaefer
Assistant Examiner—John J. Feldhaus
Attorney, Agent, or Firm—Henderson, Strom & Sturm

[57] ABSTRACT

A control system is disclosed for a cascade control of a dynamic compressor having a variable speed of rotation to maintain a constant pressure to a process. The method consists of a successive junction of control loops for controlling the speed of rotation, the flow rate of a compressor, the pressure in the delivery or in suction; the output signal of each outer loop being the input signal for the inner loop and each of the loops containing a compensating element to reduce the effects of large time constants of all inner loops.

An automatic control system based on using the above method, distinguished by its great transient and steady state precision in maintaining a main controlled parameter, and by the high reliability of protection of the compressor from surge and from a dangerous increase of the speed of rotation.

1 Claim, 4 Drawing Figures

CONTROL SYSTEM FOR CONTROLLING A DYNAMIC COMPRESSOR

BACKGROUND OF THE INVENTION

This invention relates to a means of controlling installations having a dynamic compressor with a turbine driver. The invention relates also to a protective control for a compressor, and more particularly to means for protection from surge and from a dangerously high speed of rotation.

Control systems of dynamic compressors for maintaining a constant discharge pressure have two main functions:

A. Performance control to adjust the speed of rotation of the compressor to the demands of the user's process.

B. Protective control to prevent the installation from dangerous and instable conditions of operation, and thereby to protect both the installation and the process equipment from damage.

With regard to performance control it is noted that all the dynamic compressors have what is commonly called a surge limit or surge line above which the performance of the compressor is instable. Such instability results in pulsations of pressure and flow rate which may cause damage to the compressor.

The surge line is a function of the discharge pressure ($P_2$) and the flow rate of gas through the compressor (G). The location of the surge line of any given compressor, using the coordinates $P_2$, G, is also a function of the molecular weight of gas and of the temperature and pressure of gas in the suction.

Assume here and below that the gas entering the compressor has a stable composition. Then the surge limit can be described by the well know equation:

$$H = a (P_2 - P_1), \qquad (1)$$

where:
 $H =$ the flow differential in suction;
 $P_2 =$ the pressure after the compressor;
 $P_1 =$ the pressure before the compressor;
 $a =$ constant coefficient.

According to equation (1), in order to protect the compressor from surge it is necessary and sufficient to fulfill the following condition:

$$H \geq a (P_2 - P_1) \qquad (2)$$

In coordinates $P_2$, G each point of the surge limit line can be defined also as to the point of intersection of the horizontal line corresponding to some value of $P_2$, and the curve corresponding to a certain speed of rotation $n$.

Then the equation of the surge limit will be:

$$n = f(P_2, \gamma), \qquad (3)$$

where $\gamma$ is the specific weight of gas in suction.

This method of defining the surge limit can be used in cases when the characteristics of a compressor have slope which is not too small in a zone close to the surge limit. The condition for the safe operation of the compressor in this case can be described by the following relationships:

$$n > f(P_2, \gamma) \qquad (4)$$

All known antisurge systems protect compressors from surge by letting part of the compressed as into the atmosphere or recirculating it into the suction.

The conditions (2) and (4), however, can be provided, not only by blowing off or recycling part of the gas, but also by appropriately changing the speed of rotation.

Besides surge, there is considerable danger for the compressor and the process using the compressed gas from an increase of the speed of rotation above certain limits.

It is well known that the dynamic parameters of the transient response of the compressor unit depend considerably on the inertia of rotors of both turbine and compressor and on the volume of the delivery network. Therefore, protecting the compressor from dangerous operating conditions should be made with due regard for both these parameters.

All of the above mentioned types of protective controls are generally passive controls until the pre-established limits have been reached.

In addition to the protective controls, a control is also necessary to adapt the compressor speed of rotation to the varying load requirements of the process for which compressor supplies. In order to fulfill this task, the control system of the compressor in the case being described now should maintain the required constant pressure of gas.

Both of the above mentioned functions of the control system of compressors, i.e. limiting its parameters and changing its speed of rotation in accord with the demands of the technological process, can be accomplished by means of two different methods. According to the first and conventional method, the compressor is controlled by several independent sub-systems, each of which is intended to maintain or limit one definite parameter. Each sub-system can include one or several loops connecting successively.

According to this second and improved method of the present invention, a united control system of a compressor includes several control loops connected together by logical elements. This system is built in such a way that, depending on the changing external conditions (for example the demands of the process, the specific weight of gas in suction), the loops will be connected together differently to form the control circuits for controlling corresponding control members.

If, while using the first conventional method of maintaining constant pressure, the resistance of the net of delivery of the compressor changes, then one of the parameters (the speed of rotation, or the output) can reach the permissible limit. At this moment that control loop which maintains the pressure, (and which henceforth will be called "the main control loop") and the control loop which limits one of the above mentioned parameters will begin to operate simultaneously and this continues until the moment when the output signal of the main control loop reaches saturation.

It is evident that during all of these periods of the common operation of these two loops until saturation, the main control loop, while maintaining the main parameter, prevents the other control loop from adequately protecting the compressor from approaching to the danger zone. While it is true that during the period of the common operation of the main control loop and the protective control for speed (usually short term) the steady state position of the operational point on the field of characteristics of compressor changes insignificantly (which is a positive factor); but, in contrast, the transient response of the control system moves the operational point towards or into a dangerous zone of operation.

After saturation or switching of the output signal of the main control loop, the compressor stays only under the protective control for speed, and under further growth of resistance of net delivery, nothing can prevent the compressor from moving towards the surge limit line. Thus, a fast growth of the resistance of the net can lead to dangerous consequences.

The above mentioned disadvantages may be eliminated by using a second and improved method which can be accomplished by means of a cascade control.

The cascade control system is a multi-loop system. Each loop of this system has a separate controller which is adjusted according to the transfer function of the controlled object, an input signal of the object being at the same time the output signal of the above mentioned controller and the output signal of the controlled object being the controlled parameter maintained or limited by this controller.

The number of successively connected loops can change, for example, by means of logical elements, and this number in each particular case depends on the number of the controlled or limited parameters.

According to the principal of cascade control, the loops are connected successively and in such a way that the output signal of the first loop controls some control member and the output signal of each outer loop is at the same time the input signal for the following loop.

The method of cascade control permits limiting separate controlled parameters simply and also compensating for the influence of large time constants. As a result, this makes it possible to protect the compressor unit from dangerous operational conditions with considerably higher reliability.

To illustrate this point examination of the compensation for a large time constant will be made by considering the following simple examples.

1. Assume that the controlled object has only one accumulator of energy, an aperiodical component with the transfer function:

$$G^{a.c.}(s) = \frac{k_u}{T_p s + 1} \quad (5)$$

It is evident that for full compensation of the time constant $T_p$, the controller connected directly to a controlled object should have the following transfer function of the proportional-plus-derivative component:

$$G_c^{P.I.D.}(s) = T_p s + 1 \quad (6)$$

Physically this means that for momentary changes in the output signal of the controlled object, it is necessary to feed to its input a signal with an infinitely great amplitude. It follows from the above that full compensation is unrealizable in real systems with limited resources.

It is important to add that the degree of compensation is limited not only by the energy sources, but also by the conditions of the noise stability. This is because a considerable increase in the degree of compensation is usually connected with a corresponding increase in interference sensitivity.

The real and sufficient compensation can be achieved by the well known proportional-plus-reset controller having following transfer function:

$$G_c^{P.I.}(s) = \frac{T_e s + 1}{k_e T_o s} \quad (7)$$

The time constant $T_e$ and coefficient $k_e$ should be selected so that:

$$T_e = T_p \text{ and } k_e = k_p$$

Then the transfer function of the open and closed control loops may be simply reduced to the following form:

$$G_{oP} = G^{a.c.}(s \cdot G_c^{P.I.}(s)) = \frac{1}{T_o s} \quad (8)$$

$$G_{c1} = \frac{G_{oP}}{1 + G_{oP}} = \frac{1}{1 + T_o s} \quad (9)$$

2. If the controlled object has not one, but two successively connected aperiodic components, the compensation can be achieved by means of well known proportional-plus-integral-plus-derivative controller with following transfer function:

$$G^{P.I.D.}(s) = \frac{(T_1 s + 1)(T_2 s + 1)}{k_P T_o s} \quad (10)$$

Real controlled objects in the majority of cases are sets of aperiodic components. Their time constants can differ by several orders of magnitudes. For practical purposes, however, it is usually sufficient to compensate for the influence of only those time constants of the highest order of magnitude. The transfer function of real object can be represented, for example, in the following form:

$$G_P(s) = \frac{k_P}{(T_P s + 1) \cdot \pi(\tau j s + 1)}, \quad (11)$$

where:

$$\pi(\tau j\ s + 1) = (\tau_1 s + 1) \cdot (\tau_2 s + 1) \ldots (\tau_i s + 1);$$

where:
$j = $ the ordinal number of the component;
$i = $ the number of components;
$\tau j = $ the time constants, the magnitudes of which differ from the magnitudes $T_P$ on an average by more than on one order of magnitude less.

Then, as mentioned above, it is sufficient to compensate only the time constant $T_P$.

In this case the transfer function of the closed loop (with the control feedback) can be simply transformed to the following form, $$G_{c1}(s) = \frac{1}{T_o s \cdot \pi\ (\tau j s + 1)} \quad (12)$$

The magnitude of $T_o$ (Equation 12) is selected according to the conditions of stability:

$$T_o \geq \sum_{j=1}^{i} \tau j \quad (13)$$

Without great error we can make the following approximation:

$$\pi(\tau j\, s + 1) \cong \sum_{j=1}^{i} \tau j\, s + 1 = \delta s + 1 \qquad (14)$$

Where:

$$\delta = \sum_{j=1}^{i} \tau_j$$

Correspondingly, the transfer function of the open and closed control loops will obtain the following form:

$$G_{op}(s) = \frac{1}{T_o s\,(\delta s + 1)}, \qquad (15)$$

$$G_{cl}(s) = \frac{1}{T_o \delta s^2 + T_o s + 1}. \qquad (16)$$

In other words, the compensation in the above examples is accomplished by the replacement of the open loop having a large time constant with a closed loop having a small time constant.

As it follows from the formula (13), the magnitude of the above mentioned time constant is selected with due regard for the sum of the time constants which are not subjected to the compensation.

Therefore, the problems of controlling the dynamic compressor can be solved by means of this invention, which provides for a cascade control of the parameters of the compressor, a limiting of the minimal admissible flow rate through it, and a limiting of the speed of rotation and of the discharge pressure.

SUMMARY OF THE INVENTION

The main purpose of this invention is to control the pressure of compressed gas with a high transient and steady state precision; and, the speed of rotation and minimal admissible output with high reliability, and with a practical absence of deviations during such transient process.

The main advantage of this invention is the considerably higher reliability of control of the compressor unit while operating closely to the permissible limits. This advantage permits an expansion of the safe operating zone of the gas dynamic characteristics of the compressor and also increases the safety of operation of the process using the compressed gas.

According to the present invention the dynamic compressor with turbine drive is controlled by an automatic system of cascade control. This system includes the following loops: a loop of discharge pressure, a loop of speed of rotation, a loop of minimal admissible flow rate through the compressor, and loops of control members. These enumerated loops are connected together so that the set point for the control member of the turbine is made by the loop of speed of rotation; the set point for the loop of speed of rotation is developed either by loop of the discharge or suction pressure or by loop of minimal admissible flow rate through the compressor; the set points for the loop which controls the blow-off valve is developed by discharge or suction pressure loop. Depending on the external conditions, the loops are successively connected between themselves in required order. The loops form the control circuits for controlling separate control members, these control circuits being operated in parallel.

An object of this invention is to operate a compressor control system in such a way as to compensate for the distrubing influences of inertia on the rotor of a compressor unit and for the volume of the net delivery.

Another object of this invention is to provide a highly reliable means for limiting the speed of rotation.

A further object of this invention is to provide a control system to limit the minimal flow rate through a compressor by appropriate changing the speed of rotation, while maintaining the desired discharge pressure by the blowing off or recycling of gas from the discharge to the suction port.

Other objects, advantages and novel features of the invention will become apparent from the following detailed description of the invention when considered in conjunction with the accompanying drawings.

DETAILED DESCRIPTION OF THE INVENTION

Figure 1:
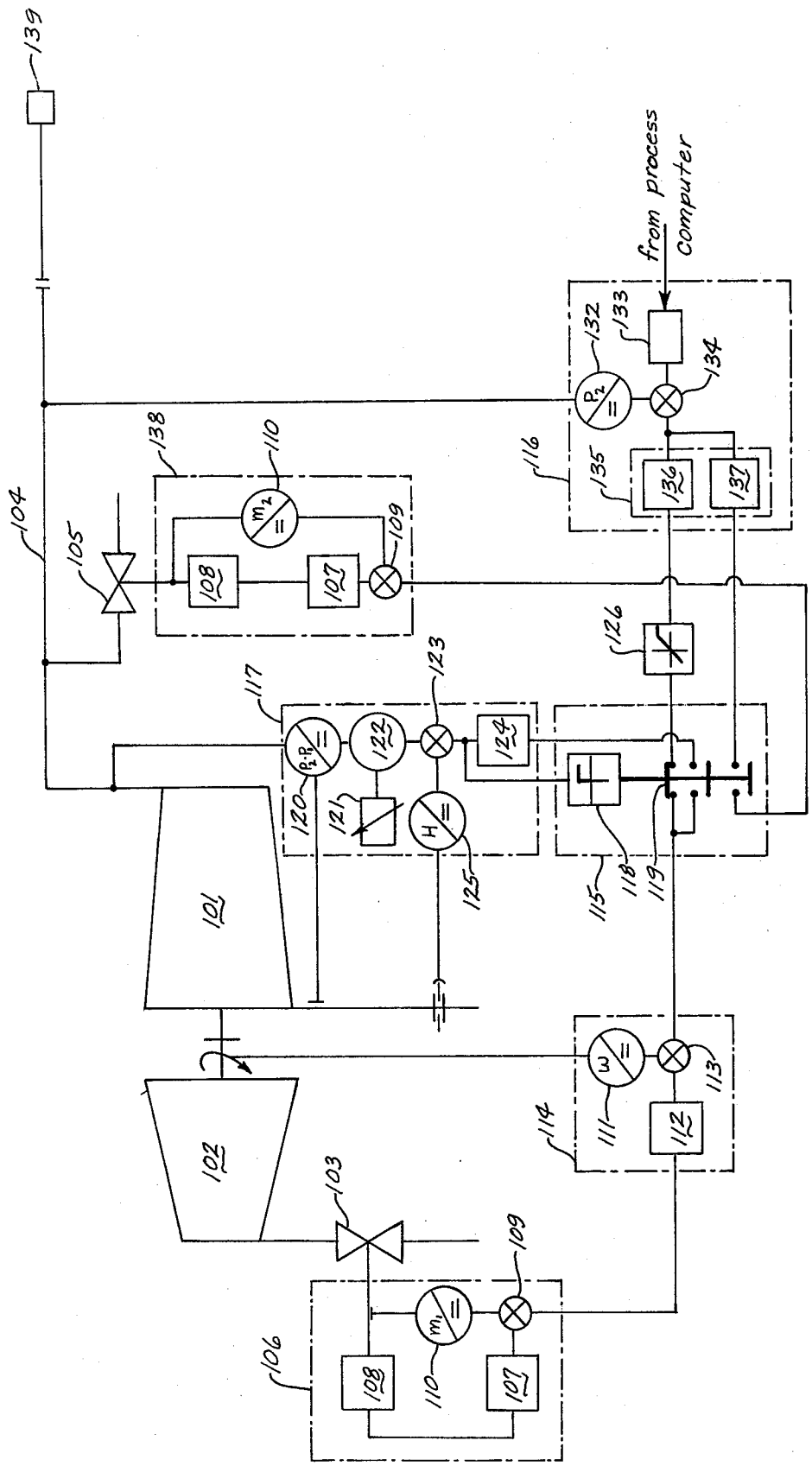
FIG. 1 is a schematic diagram of the control system of the compressor.

Referring now to the drawings, FIG. 1 shows a compressor installation with the control system of the present invention. The installation includes, for example, a dynamic compressor 101 for compressing the gas, a turbine drive 102 having a steam distribution system 103, and a pipeline 104 connecting the compressor 101 with a user 139 of compressed gas. The pipeline 104 is supplied by a blow-off valve 105.

The control system shown in FIG. 1 is a multi-loop system using a cascade control. The first loop 106 of this system is for controlling the steam distribution system 103. The loop 106 includes a position controller 107, an actuator 108, a comparator 109 and a position transmitter 110.

The position transmitter 110 measures the position of the actuator 108 and sends its output signal to the comparator 109. The comparator 109 compares the actual position of the actuator with a set point, and sends the difference signal to controller 107 as an input signal.

Figure 2:
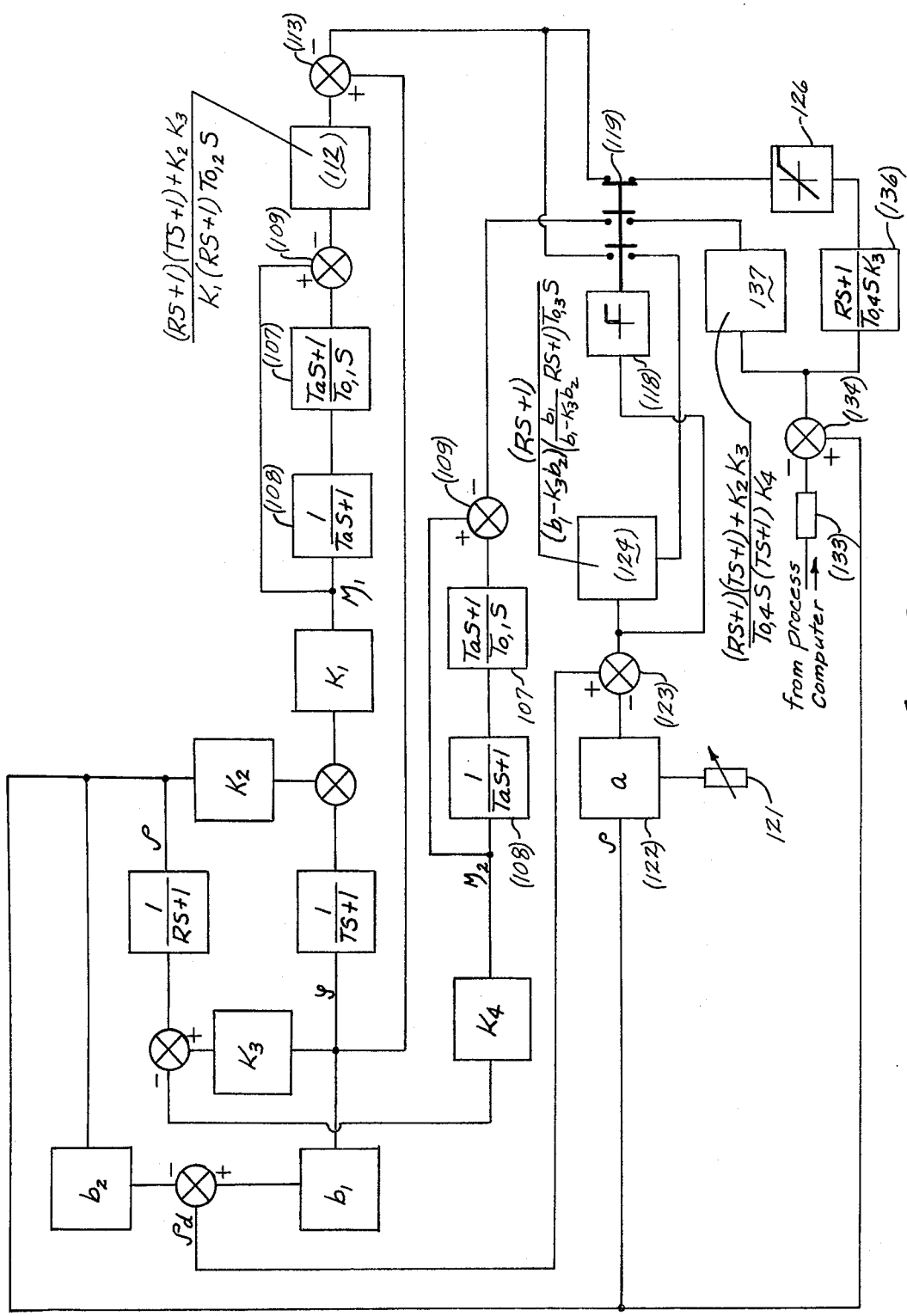
FIG. 2 is a block-diagram of the compressor control system shown in FIG. 1.

According to FIG. 2, wherein the numbers in brackets shown in FIG. 2 correspond to the elements shown in FIG. 1, the transfer function of the actuator 108 is $$G_{ac}(s) = \frac{1}{T_{1,a}s + 1}, \qquad (17)$$

where:

$T_{1,a}$ = the time constant of the actuator 108.

The actuator 108 is a well known aperiodic component. In order to compensate the time constant $T_{1,a}$, the transfer function of the controller 107 is selected according to formula (7):

$$G_{1,c}(s) = \frac{T_{1,a}s + 1}{T_{o,1}s}. \qquad (18)$$

In formula (18) and below the small time constants, which are not subjected to compensation, are supplied with subscript $o$. Accordingly, the transfer function of the whole control loop 106 of the steam distribution system 103 can be transformed to the following form:

$$G_{1,cl}(s) = \frac{1}{T_{o,1}s + 1} \qquad (19)$$

The second control member of the control system (the blow-off valve 105) has an analogous control loop 138. The transfer function of the control member 105 will be also:

$$G^{1}_{1,cl}(s) = \frac{1}{T_{o,1}s + 1} \qquad (20)$$

The following control loop of the control system shown on FIG. 1 is the loop 114 for controlling the speed of rotation. This loop 114 develops the set point for the loop 106 and includes a speed transducer 111, a speed controller 112, and a comparator 113.

According to FIG. 2, the transfer function of the controlled object including the turbine 102, the compressor 101, the pipeline 104 and the control loop 106 of the steam distributing system 103 will be:

$$G_{2,ad}(s) = \frac{(Rs + 1)k_1}{[(Rs + 1)(Ts + 1) + k_2k_3](T_{o,1}s + 1)}, \qquad (21)$$

Where:
$R$ = the time constant of the net of delivery,
$T$ = the time constant of the rotors of turbine and the compressor,
$T_{o,1}$ = the time constant of the loop 106, and
$k_1, k_2, k_3$ = the constant coefficients.

Correspondingly, the transfer function of the speed controller 112 is selected so that the time constants $R$ and $T$ will be compensated:

$$G_{2,sp.c} = \frac{(Rs + 1)(Ts + 1) + k_2k_3}{k_1(Rs + 1)T_{o,2}s} \qquad (22)$$

Then the transfer function of the whole closed loop of speed of rotation, which includes the control loops 114 and 106, steam distributing device 103 and the turbine 102, can be transformed to the following form:

$$G_{2,cl} = \frac{1}{T_{o,2}s(T_{o,1}s + 1) + 1} \qquad (23)$$

The control loop 114 of speed of rotation receives its setpoint from whichever one of the control loops 116 or 117 which is immediately outer with respect to the speed loop 114, by means of the distributing device 115. The control loop 116 is intended to control the discharge pressure, and the control loop 117 is intended to control the minimal admissible flow rate through the compressor 101.

The construction of the distributive device 115 and the loop 117 of minimal admissible flow rate can be different. For example, consider the two different versions of construction.

According to first version, FIG. 1, the distributive device 115 includes a relay element 118 and a switch 119. Relay element 118 controls the switch 124 based on a signal corresponding to the difference between the actual and minimal admissible magnitudes of the flow differential in suction. This signal is proportional to the last said difference and it comes from the comparator 123.

The switch 119 connects the input of the speed control loop 114 with the pressure loop 116 until the flow differential in suction becomes less than its minimum admissible magnitude under the given pressure differential across the compressor. After that, the input of the speed loop 114 connects with the loop of minimal admissible flow rate 117 and the output of the pressure loop 116 connects to a loop 138 for controlling the blow-off valve 105.

In this case, the compressor 101 is protected from surge by increasing the speed of rotation, and the discharge pressure of the gas is maintained at the required level by blowing off into the atmosphere or by recycling the corresponding part of the compressed gas into the suction.

The control loop of minimal admissible flow rate 117, according to the first version, includes a transmitter 120 for sensing the pressure differential across the compressor, a manual set point device 121, a multiplier 122, a comparator 123, a controller of minimal admissible flow rate through the compressor 124, and a transmitter 125 of flow differential in suction.

According to the equation (1), the magnitude of the minimal admissible flow rate through the compressor can be calculated by means of the multiplier 122 receiving signals form the transmitter 120, such signals corresponding to changes in the pressure differential across the compressor.

The multiplier 122 and the transmitter 125 send their output signals to the comparator 123. Comparator 123 develops an output signal for the controller of minimal flow rate 124 and for the relay element 118. According to FIG. 2, the transfer function of the controlled object relating to the considering loop will be:

$$G_{3,mfr} = \frac{(b_1 - k_3b_2)\left(\frac{b_1}{b_1 - k_3b_2}Rs + 1\right)}{(Rs + 1)[T_{o,2}s(T_{o,1}s + 1) + 1]} \qquad (24)$$

Accordingly, the transfer function of the controller 125 of minimal flow rate is selected to compensate the time constant R:

$$G_{3,c} = \frac{Rs + 1}{(B_1 - k_3b_2)\left(\frac{b_1}{b_1 - k_3b_2}Rs + 1\right)T_{o,3}s} \qquad (25)$$

In this case, the transfer function of the whole closed loop of minimal flow rate can be simply transformed to the following equation:

$$G_{3,cl} = \frac{1}{T_{3,o}s[T_{o,2}s(T_{o,1}s + 1) + 1] + 1} \qquad (26)$$

The control loop 117 limits the reduction of the flow rate through the compressor depending on the requirements of antisurge protection. Normally this loop should operate in parallel with the pressure loop 116. Both of these loops 116 and 117 mutually supplement each other, increasing the reliability of the protection of the compressor from surge.

During an increasing of the resistance of the discharge network, the loop 117 of minimal flow rate protects the compressor by increasing the speed of rotation, and the pressure loop 116, by blowing off a part of the compressed gas into the atmosphere.

The second version of construction of the distributive device 115 and the loop 117 can be effectively used in a case when the gas dynamic characteristics of the dynamic compressor have a slope that is not too small.

Figure 3:
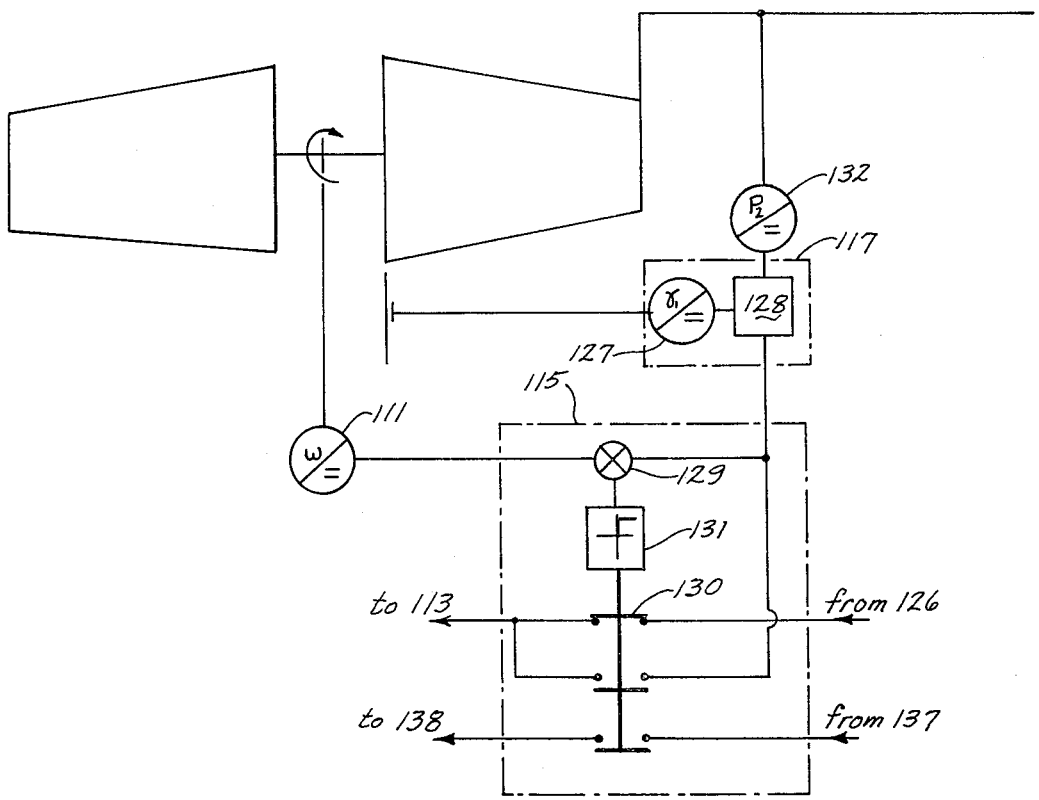
FIG. 3 is a schematic diagram of the control loop for limiting the minimal admissible output of the compressor.

According to this version shown in FIG. 3, a transmitter 132 of pressure measures the pressure in the compressor discharge, a transmitter 127 measures the specific weight of the gas in the compressor suction, and a calculating device 128, based on the minimal admissible magnitude of speed of rotation, develops the set point for the speed loop 114. In this particular case, the minimal admissible speed of rotation, according to the required conditions for antisurge protection, is calculated as a function of the discharge pressure and the specific weight of the gas in the compressor suction (See Formula 3).

The distributive device 115 shown in FIG. 3 includes a comparator 129 and a switch 130. The comparator 129 receives signals from the transmitter 111 and from the calculating device 128 which signals of both transmitter 111 and device 128 correspond to the actual and to the minimal permissible magnitudes of the speed of rotation, compares these magnitudes and, depending on the result of the comparison, controls the switch 130 by means of a relay 131.

This switch 130, under normal conditions, (which means if the speed of rotation exceeds the minimal level defined by the conditions for antisurge protection) connects the output signal of the pressure loop 116 only with the input of the speed loop 114. But, as soon as the speed of rotation reaches its minimal permissible level, the input of the loop 114 immediately connects with the output signal of the loop 117, and simultaneously, the output signal of the pressure loop 116 connects to the blowoff valve 105 (FIG. 1). The main advantage of this last described version lies in its simplicity.

As shown in FIG. 1, the pressure loop 116 includes a pressure transmitter 132, a comparator 134, the set point device 133 which can be controlled, for example, by a digital process computer controlling the whole plant, the comparator 134 and a pressure controller 134 consisting of two channels, 136 and 137, each of which is adjusted according to a certain transfer function. Thus, the channel 136, connecting with the speed loop 114, is adjusted according to the following transfer function (See FIG. 2):

$$G^{1}_{4,pr}(s) = \frac{k_3}{[T_{o,2}s(T_{o,1}s+1)+1](Rs+1)} \quad (27)$$

Correspondingly, the transfer function of the pressure controller 135 will have the form:

$$G^{1}_{4,p.c.}(s) = \frac{Rs+1}{k_3 T_{o,4}s} \quad (28)$$

Then the transfer function of the whole closed pressure loop, which includes the control loops 116, 114 and 106, steam distributing device 103, turbine 102 and compressor 101, can be transformed to the following form:

$$G^{1}_{P,cl}(s) = \frac{1}{T_{o,4}s[T_{o,2}s(T_{o,1}s+1)+1]+1} \quad (29)$$

A channel 137 of the loop 116 connected to blow-off valve 105 is adjusted in accordance to the following transfer function:

$$G^{11}_{4,pr}(s) = \frac{(Ts+1)k_4}{[(Rs+1)(Ts+1)+k_2k_3](T_{o,4}s+1)} \quad (30)$$

Correspondingly, the transfer function of the pressure controller 135 and the whole closed pressure loop can be simply transformed to the following forms:

$$G^{11}_{4,p.c.}(s) = \frac{(Rs+1)(Ts+1) = k_2k_3}{k_4 T_{o,4}s(Ts+1)} \quad (31)$$

$$G^{11}_{4,p.cl}(s) = \frac{1}{T_{o,4}s(T_{o,1}s+1)+1} \quad (32)$$

According to FIG. 1 the output signal of the pressure control loop 116 comes to a saturating element 126. This element 126 is intended to protect the compressor unit from dangerous speed of rotation growth by the saturation of a set point to the speed control loop 114.

Figure 4:
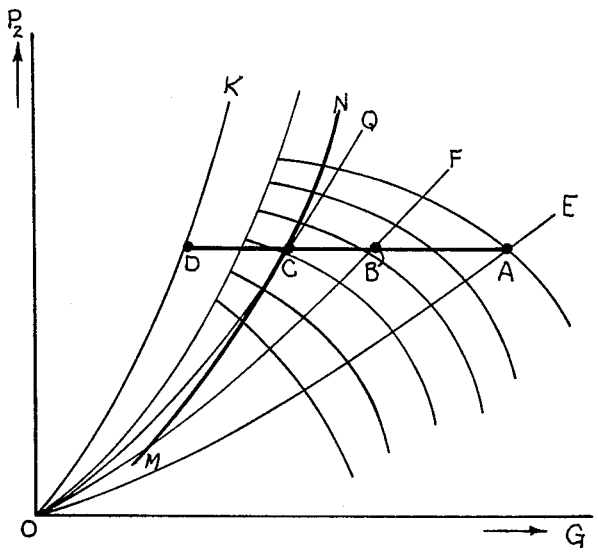
FIG. 4 shows the gas dynamic characteristics of a compressor with the plotted lines of operating conditions and illustrating the lines of minimal admissible output and maximum admissible speed of rotation.

The operation of the system shown in FIG. 1 can be illustrated by following examples (See FIG. 4).

Assume that at an initial moment the characteristic of the discharge network is defined by the curve OE, and the dynamic compressor works at point A. Then, as a result of the increase of resistance of net delivery the characteristic of the net delivery changes its position and takes the shape OF.

Under such circumstances the compressor immediately shows a tendency to increase the discharge pressure. However, the control loop 116, acting through the channel 136 of pressure controller 135, decreases the set point to the speed control loop 114. Correspondingly, the speed loop 114 begins to decrease the speed of rotation until the required magnitude of discharge pressure will be restored. The new operating point of the compressor will be then displaced from the point A to the point B, which is the point of the intersection of the control line AD of pressure controller 135 and the new curve of resistance of net delivery OF.

If the resistance of the net continues to increase and the characteristics of the net adopts the curve OQ, the speed of rotation of the compressor 101 will change by means of the control loops 116 and 114 until the control line AD of the pressure controller 135 will cross the control line MN of the minimal flow differential controller 124. At this moment the distributing device 115 through the switch 119 simultaneously connects the output signal of the control loop 117 with the speed loop 114 and switches the output signal of the pressure loop 116. If before said switching of the output signal of the pressure control loop 116 was emitted by the channel 136 and was connected to the input of the speed control loop 114, then after switching, the output signal of loop 116 is emitted by the channel 137 and is connected to the input of the control loop 138 of the blow-off valve 105. This important change in the control system's response to the changed external conditions significantly improves the transient precision and stability of the system.

If after that the resistance of net of delivery still continues to rise (and the characteristic of the net of delivery adopts the position OK, FIG. 4), then the operating point of compressor 101 will still correspond to the point C (if not to take into consideration a transient response). The reason is that this point C is the only point which will simultaneously satisfy the equations of the control lines of both of the controllers 135 and 124. The excess amount of compressed air corresponding to the section DC (FIG. 4) will be then blowed off in the atmosphere or recirculated into the suction by means of the valve 105 (FIG. 1).

Obviously many modifications and variations of the present invention are possible in light of the above teachings. It is therefore to be understood that, within the scope of the appended claims, the invention may be practiced otherwise than as specifically described.

We claim:

1. Control apparatus for controlling the operation of a controlled object comprising a dynamic compressor, a turbine driver of said compressor having a control member for changing the torque output of the turbine, a pipeline connecting said compressor to a user of gas, a suction flow differential device installed upstream from the suction port of the compressor, and fluid relief means for releasing compressed gas from said pipeline, the improvement comprising:

a control loop for controlling the position of said turbine control member, said control loop including an actuator for the turbine control member, a transmitter for indicating the position of said turbine control member, means for developing a signal responsive to a difference between the actual and the required position of said turbine control member and a proportional-plus-integral controller of the position for said turbine control member; said proportional-plus-integral controller being connected directly to said actuator, the proportional-plus-integral controller and the actuator together having a negative feedback which includes said position transmitter;

a speed control loop for controlling the speed of rotation of the compressor, said speed control loop developing the set point for the position loop of the turbine control member; said speed control loop including a speed transmitter, means for developing a signal responsive to the difference between the actual and the required speed, and a speed controller having a transfer function which represents the sum of the transfer function of a proportional-plus-integral component and the product of the transfer functions of an integral component and an aperiodic component; said speed controller being connected directly to the controlled object, said controlled object including the position loop of the turbine control member, the control member itself and the turbine; the output signal of said controlled object corresponding to the speed of rotation and both the speed controller and the related controlled object together having a negative feedback which includes the speed transmitter;

a control loop for controlling the position of the fluid relief means which is connected to said pipeline; said position control loop including:

an actuator for said fluid relief means, a transmitter for indicating the position of this fluid relief means, means for developing a signal, which signal is responsive to a difference between the actual and the required position of said first fluid relief means, and a proportional-plus-integral controller of position of said fluid relief means, the last said proportional-plus-integral controller being connected directly to the actuator of said fluid relief means and said last proportional-plus-integral controller and the actuator together having a negative feedback which includes said position transmitter of the fluid relief means;

a control loop of minimum output of the compressor, this minimum output control loop limiting the minimum suction flow differential according to surge protection conditions and said minimum output control loop also developing the set point for the speed loop; said minimum output control loop including:

a transmitter emitting a signal corresponding to the pressure differential across the compressor, means for multiplying the pressure differential signal by a constant coefficient, and therefore developing a signal corresponding to the required minimum suction flow differential, said means for measuring the flow differential in the suction port, means for developing a signal responsive to a difference between the actual and the required flow differential in the suction port, and a minimum flow differential controller; the transfer function of said minimum flow differential controller being the product of a transfer function of a proportional-plus-integral component and a transfer function of an aperiodic component; said minimum flow differential controller being connected to a controlled object, the last said controlled object comprising the closed speed control loop with its corresponding controlled object and the compressor; the output signal of the minimum output control loop corresponding to the suction flow differential and the minimum flow differential controller and the related controlled object together having a negative feedback which includes a suction flow differential transmitter;

a pressure control loop for controlling the discharge pressure and developing the set points for the speed control loop and also for the control loop for controlling the position of the fluid relief means; said pressure control loop including a set point device, a transmitter of discharge pressure, means for developing a signal responsive to the difference between the actual and required discharge pressure, and a pressure controller; said pressure controller comprising two channels having a common input; the first channel developing the set point for the speed control loop, and the second channel developing the set point for the loop controlling position of said fluid relief means; said first channel being a proportional-plus-integral component; said first channel being connected to a controlled object, the last said controlled object comprising the speed control loop with its corresponding controlled object and the compressor; the output signal of said controlled object of the first channel of the pressure loop corresponding to the discharge pressure, and the first channel of the pressure controller and the related controlled object together having a negative feedback which includes a discharge pressure transmitter; the transfer function of said second channel representing the sum of the transfer function of a proportional-plus-integral component and the product of the transfer function of an integral component and an aperiodic component; said second channel being connected to a controlled object; said controlled object being related to the second channel comprising the control loop of the position of the fluid relief means, said fluid relief means itself, and the delivery network; the output signal of the respective controlled object of said second channel corresponding to the discharge pressure, and the second channel and the said controlled object together having a negative feedback which includes a discharge pressure transmitter;

nonlinear means for saturating the set point for the closed speed control loop, said set point being developed by the first channel of the discharge pressure controller;

a distributing means for connecting the output signals of the pressure or of the minimum output control loops, depending upon the pressure differential across the compressor, to the speed control loop or to the control loop for controlling the position of said fluid relief means;

said distributive means connecting the input of the speed control loop to the output of the first channel of the pressure controller until the suction flow differential reaches its minimum admissible magnitude corresponding to the actual pressure differential across the compressor, at which time said input of the speed control loop is switches to the output of the minimum output control loop, and the output of the second channel of the pressure controller is connected to the control loop for controlling the position of said fluid relief means.

* * * * *